United States Patent [19]

Luther

[11] Patent Number: 5,500,919
[45] Date of Patent: Mar. 19, 1996

[54] GRAPHICS USER INTERFACE FOR CONTROLLING TEXT-TO-SPEECH CONVERSION

[75] Inventor: Willis J. Luther, Irvine, Calif.

[73] Assignee: Canon Information Systems, Inc., Costa Mesa, Calif.

[21] Appl. No.: 977,680

[22] Filed: Nov. 18, 1992

[51] Int. Cl.⁶ ................................................ G10L 9/00
[52] U.S. Cl. ........................................................ 395/2.69
[58] Field of Search ............................ 395/2, 2.69, 2.79; 381/51–53

[56] References Cited

U.S. PATENT DOCUMENTS

| | | | |
|---|---|---|---|
| 4,695,962 | 9/1987 | Goudie | 381/51 |
| 4,799,254 | 1/1989 | Dayton et al. | 379/96 |
| 4,884,972 | 12/1989 | Gasper | 395/152 |
| 5,091,931 | 2/1992 | Milewski | 379/100 |
| 5,278,943 | 1/1994 | Gasper et al. | 395/2 |

FOREIGN PATENT DOCUMENTS

| | | |
|---|---|---|
| 215309 | 3/1987 | European Pat. Off. . |
| 402911 | 12/1990 | European Pat. Off. . |
| 405029 | 1/1991 | European Pat. Off. . |

*Primary Examiner*—Allen R. MacDonald
*Assistant Examiner*—Michelle Doerrler
*Attorney, Agent, or Firm*—Fitzpatrick, Cella, Harper & Scinto

[57] ABSTRACT

A system for controlling how text is fed to a text-to-speech converter. Text is controllably fed from a text buffer to a text-to-speech converter, the control being based on operator commands which are effectuated at text boundaries, such as word boundaries or sentence boundaries. Operator commands can include commands to advance through the text in a file, in which case text is fed to the text-to-speech converter on a selectable level of granularity, for example, next word, next sentence, next paragraph, etc. It is also possible to advance through the text file rapidly in which case only a sampling of text segments, for example, three words out of twenty, are fed to the text-to-speech converter. Text segments can be repeated, and text segments can be searched for.

70 Claims, 6 Drawing Sheets

GRAPHICS USER INTERFACE FOR CONTROLLING TEXT-TO-SPEECH CONVERSION

BACKGROUND OF THE INVENTION

1. Field of the Invention

The present invention pertains to a method and apparatus for controlling the text that is provided to a text-to-speech converter, and, in particular, to a system in which the text is controllably fed to a text-to-speech converter based on user commands which are effectuated at text boundaries such as the ends of words or sentences.

2. Description of the Related Art

As the use of direct text-to-speech conversion techniques increases, it is becoming more and more commonplace for an operator to feed a text file, or an arbitrary file containing text, to direct text-to-speech conversion system which "speaks" the text contained in that file. Conventional systems, however, provide for only very limited control over the management of the text that is fed to the text-to-speech converter. Generally, only simple controls, like those used to control sound recordings, are provided, such as to begin speaking a text file or to stop speaking a file. Such controls may have been sufficient to control sound recordings but they are inadequate to control the management of text that is fed to a text-to-speech converter. In particular, those controls often result in beginning or ending text-to-speech conversion at random places in the text, for example, in the middle of words or sentences.

This often proves a drawback to an operator, particularly when a significant amount of text is involved as is the case when speaking electronic mail files which include attached text files, and when speaking presentation materials, etc.

SUMMARY OF THE INVENTION

It is an object of the invention to address the foregoing difficulties.

In one aspect, the invention is a system that controls the text that is fed to a text-to-speech converter. According to this aspect of the invention, a text-to-speech controller includes means for controllably feeding text from a text buffer to a text-to-speech converter and a controller for controlling how text is fed to the text-to-speech converter based on operator commands. The commands are not necessarily effectuated when they are issued but rather they are effectuated at text boundaries, such as the ends of words or sentences. Operator commands can include commands to advance through the text in a file, in which case text is fed to the text-to-speech converter at a selectable level of granularity, for example, next word, next sentence, next paragraph, etc. It is also possible to advance through the text file rapidly in which case only a sampling of text segments, for example, three words out of twenty, are fed to the text-to-speech converter. Text segments can be repeated, and text segments can be searched for.

In another aspect, a graphical user interface is provided to accept operator commands to control how text is fed to the text-to-speech converter. The graphical user interface described here resembles the controls of a typical consumer video cassette recorder, and includes controls to load files, to restart speaking a file from its beginning, to rewind the file, to parse out text segments from the file, to record text into the file, to fast forward, to pause, to stop and to unload files. Commands input by an operator via the graphical user interface are effectuated at text boundaries such that, for example, a command to stop will cause text to continue to be fed to the text-to-speech converter and to stop at the end of the current sentence. The graphical user interface may also include a state register which shows the current state of the apparatus, and may further include a text display to display the text that is currently being enunciated, as well as a picture of a person's head which mimics a speaker. Further graphical user interfaces may be provided based on operator selection so as to vary text-to-speech parameters such as volume, speed, pitch and voice.

The text-to-speech controller of the invention may be provided on a personal computer, such as an IBM PC or PC-compatible computer. Most conveniently, the text that is to be enunciated by the text-to-speech converter is loaded into a text buffer and a pointer or index to that buffer designates which text is to be fed to the text-to-speech converter. The pointer is controllably positionable within the text buffer via the graphical user interface commands.

This brief summary has been provided so that the nature of the invention may be understood quickly. A more complete understanding of the invention can be obtained by reference to the following detailed description of the preferred embodiment thereof in connection with the drawings which together form a complete part of the specification.

BRIEF DESCRIPTION OF THE DRAWINGS

FIG. 5 comprising

DETAILED DESCRIPTION OF THE PREFERRED EMBODIMENT

Figure 1:
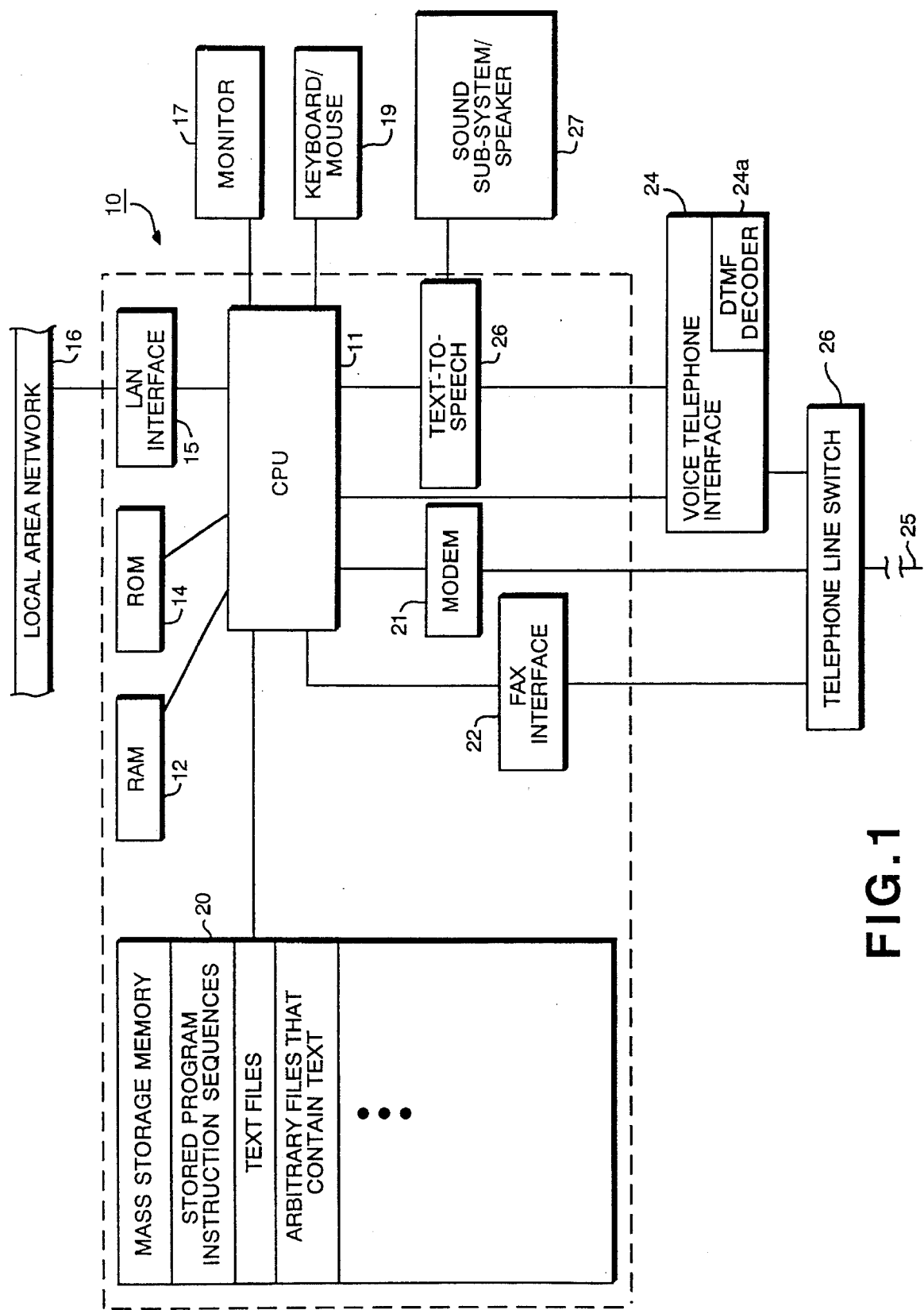
FIG. 1 is a block diagram showing an embodiment of the present invention.

FIG. 1 is a schematic block diagram of an apparatus according to the invention.

In FIG. 1, reference numeral 10 designates personal computing equipment such as an IBM PC or PC-compatible computer. Computing equipment 10 includes a CPU 11 such as an 80386 processor which executes stored program instructions such as operator-selected applications programs that are stored in RAM 12 or specialized functions such as start-up programs which are stored in ROM 14. Computing equipment 10 further includes a local area network interface device 15 which provides access to a local area network 16 whereby the computing equipment can access files on a remote file server or send files for remote printing or otherwise interact with a local area network in accordance with known techniques such as by sending or receiving electronic mail.

Computing equipment 10 further includes a monitor 17 for displaying graphic images and a keyboard/mouse 19 for allowing operator designation and inputting functions.

Mass storage memory 20, such as a fixed disk or a floppy disk drive is connected for access by CPU 11. Mass storage memory 20 typically includes stored program instructions sequences such as an instruction sequence for text parsing according to the invention, or other application programs such as word processing application programs, optical character recognition programs, spread sheet application programs, and other information and data processing programs. Mass storage memory 20 further stores text files which are to be spoken by the text-to-speech converter, as well as arbitrary files which can contain text but which also may include unpronounceable characters such as bit map images, executable programs, control sequences, etc. Other data may be stored on mass storage memory 20 as desired by the operator.

A modem 21, a facsimile interface 22, and a voice telephone interface 24 are provided so that CPU 11 can interface to an ordinary telephone line 25. Each of the modem 21, facsimile interface 22, and voice telephone interface 24 are given access to the telephone line 25 via a telephone line switch 26 which is activated under control by CPU 11 so as to connect the telephone line 25 to one of the modem 21, the facsimile 22 or the voice telephone interface 24, as appropriate to the data on the telephone line. Thus, CPU 11 can send and receive binary data such as ASCII text files via modem 21, it can send and receive facsimile messages via facsimile interface 22, and it can interact on ordinary voice telephone lines via voice telephone interface 24. In this regard, voice telephone interface 24 is provided with a DTMF decoder 24a so as to decode tones on voice telephone which correspond to operator depressions of a telephone keypad. The decoded tones are interpreted by CPU 11 as operator commands in accordance with program instructions stored in mass storage memory 20.

A conventional text-to-speech converter 26 is connected to CPU 11. The text-to-speech converter 26 interprets text strings sent to it and converts those text strings to audio speech information. The text-to-speech converter 26 provides the audio speech information either to a sound subsystem/speaker 27 for enunciation to a local computer operator, or provides the audio speech information to the voice telephone interface 24 for enunciation over ordinary voice telephone lines.

Figure 2:
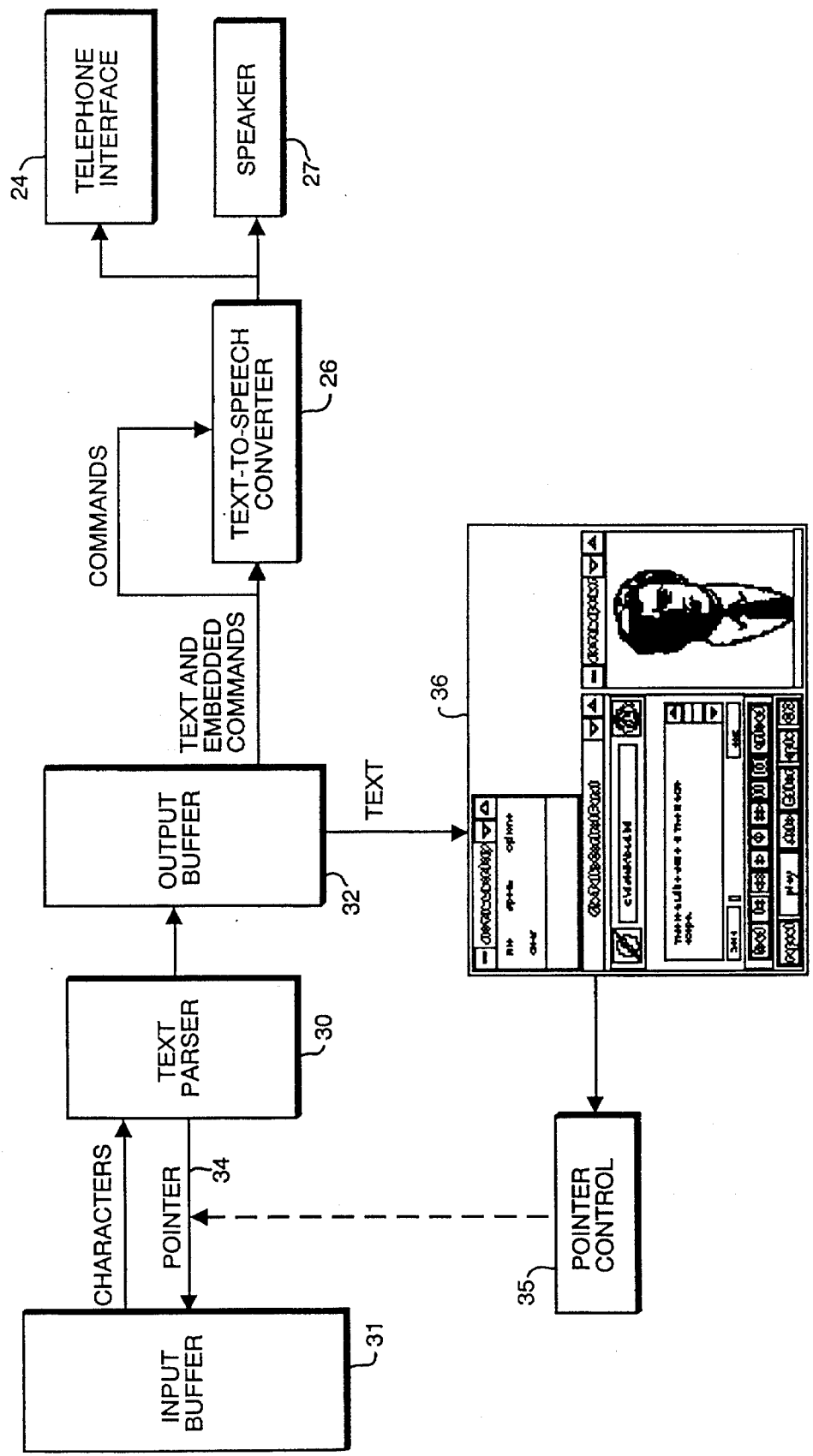
FIG. 2 is a functional block diagram for explaining how text is fed to a text-to-speech converter

FIG. 2 is a functional block diagram for explaining how text is selected for feeding to the text-to-speech converter. In FIG. 2, 30 is a text parser for parsing text that is stored in input buffer 31 and for storing parsed text and embedded speech commands in output buffer 32. Embedded speech commands cause text-to-speech converter 26 to vary text-to-speech conversion parameters such as volume, pitch, speed, voice, etc. The parsed text in output buffer 32 is spoken by text-to-speech converter over voice telephone interface 24 or over speaker 27 as explained above.

Text parser 30 is implemented in accordance with a stored program instruction sequence stored in mass storage memory 20 and executed by CPU 11. A suitable text parser is described in my co-pending application entitled "Text Parser For Text-To-Speech Processor" the contents of which are incorporated by reference as if set forth here in full. Typically, the stored program instruction steps for the text parser are stored in RAM 12 and executed out of RAM. Likewise, input buffer 31 and output buffer 32 are stored in other locations in RAM 12.

The text that is stored in input buffer 31 and which is parsed by text parser 30 may be provided from a variety of text sources. For example, the text may be generated by word processing programs which have been executed by CPU 11 and which stores the resulting word processed files in mass storage memory. The text may also be obtained by similarly processed word processed files which are accessed from a file server across local area network 16. Or, the text may be obtained from electronic mail messages which are sent and received to users in the local area network over the local area network 16. The text files may also be obtained in binary format, for example, ASCII, from modem 21 via telephone line 25 and telephone line switch 26. Such binary data is often associated with computerized bulletin boards and are downloaded by CPU 11 in accordance with stored program instruction sequences.

The text file may also be obtained by optical character recognition processing of a facsimile document that is received from telephone line 25 via facsimile interface 22. In accordance with conventional technology, facsimile images that are received from facsimile interface 22 are converted by CPU 11 into bit map images and the bit map images are subjected to optical character recognition processing. The text files that result from optical character recognition processing may be stored in mass storage memory 20 and thereupon provided to input buffer 31, or may be provided directly to input buffer 31.

Text in input buffer 31 is fed to the text parser 30 in accordance with the position of a controllably positionable pointer 34. The position of pointer 34 is controlled in accordance with pointer controller 35 which accepts operator commands such as commands from graphical user interface 36 or commands from the DTMF decoder 24a. The commands are effectuated at text boundaries. For example, through the graphical user interface 36, an operator may issue a command to stop a text-to-speech conversion process. Based on that command, pointer controller 35 causes pointer 34 to continue to advance through the text in output buffer 32 and to stop at the next text boundary, for example, at the end of a sentence. Detailed operations of pointer controller 35 in connection with graphical user interface 36 are described below in connection with the flow diagram of FIG. 5.

Figure 3:
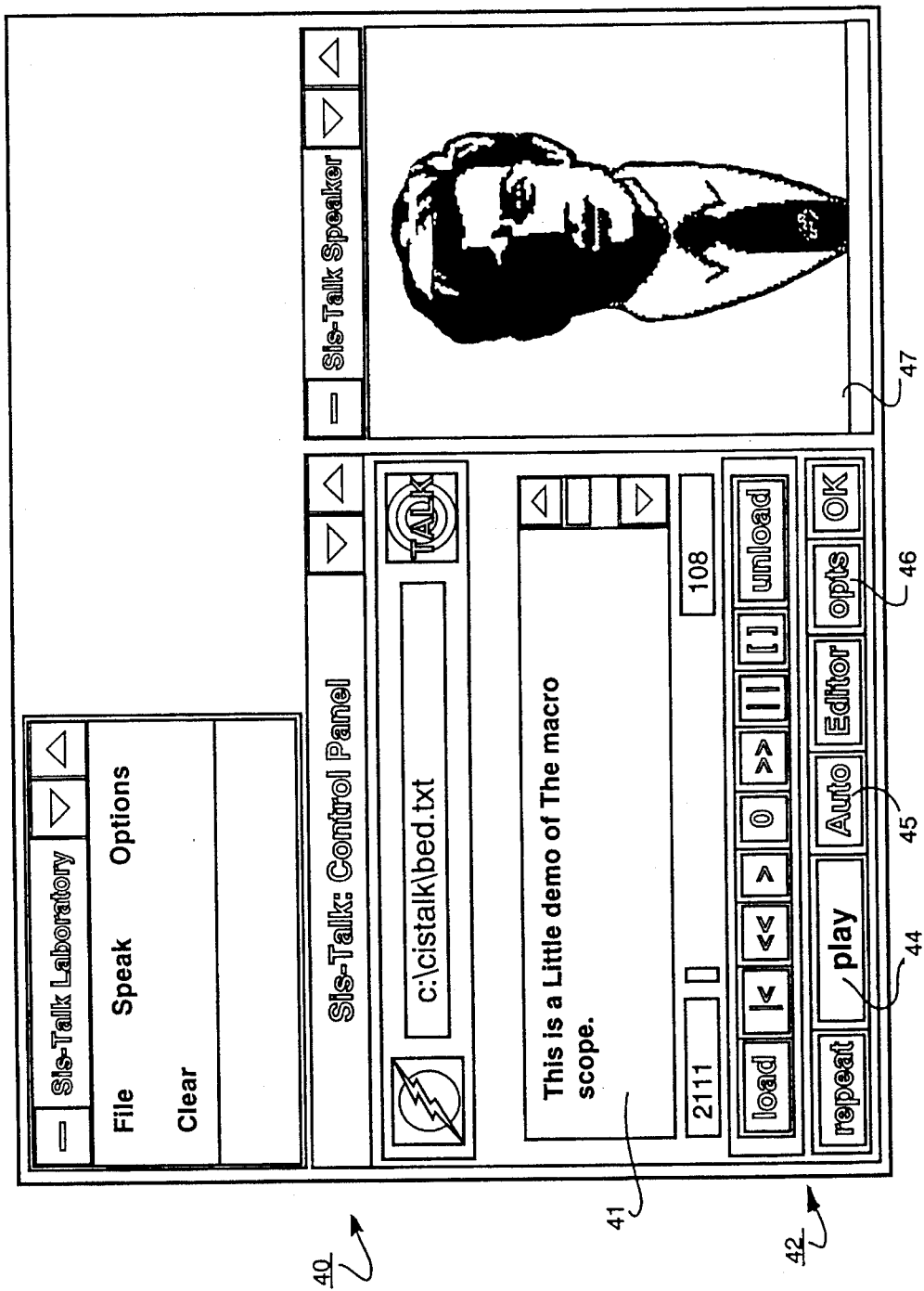
FIGS. 3 and 4 are detailed views of graphical user interfaces provided by the present invention.
Figure 4:
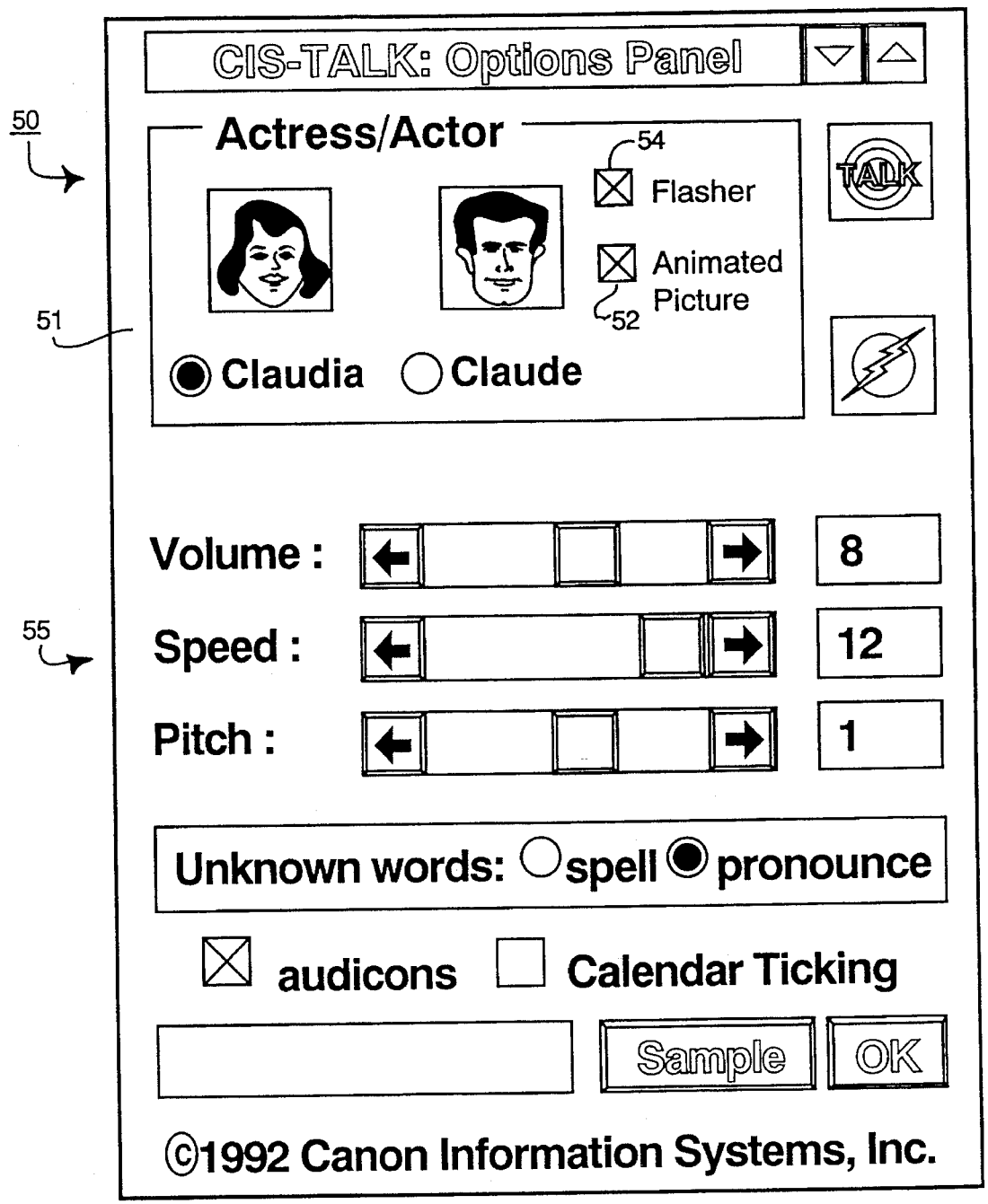

FIGS. 3 and 4 are views for showing the graphical user interfaces which CPU 11 displays on monitor 17. As shown in FIG. 3, the graphical user interface includes a control panel 40 which includes a display area 41 and a graphical user interface area 42. The display area is for displaying text that is currently being provided to the text-to-speech converter 26 and being enunciated by converter 26. Control panel 42 is a VCR-style control panel and includes a load button "LOAD", a restart button "|<", a rewind button "<<", a play/parse button ">", a record button "0", a fast forward button ">>", a pause button "||", a stop button "[]", an unload button "UNLOAD", a repeat button "REPEAT", a status register 44, an auto/step toggle selector 45, and an options button 46 which provides a further menu for selection.

Each of the buttons in area 42 may be selected by operator input via keyboard/mouse 19. Preferably, a separate mouse is provided whereby a user may target an area on the graphical user interface and select the targeted button by clicking the mouse.

The graphical user interface further includes a talking head area 47 in which an animated figure mimics a speaker enunciating the text which is displayed in area 41 and which is currently being enunciated by text-to-speech converter 26.

FIG. 4 a illustrates a graphical user interface 50 which is displayed on monitor 17 when options button 46 (FIG. 3) is depressed. As shown in FIG. 4, this graphical user interface includes an area 51 which provides for selection of a male or female talking head and which provides for whether the talking head is displayed or not via selector 52 ("ANIMATED PICTURE"). Area 51 also includes a further option 54 which causes text displayed in area 41 to be highlighted as it is enunciated, for example, by underlining or by flashing.

Graphical user interface 50 also includes an area 55 by which parameters for text-to-speech conversion may be selected. Such parameters include volume, speed, pitch and, via area 51, voice. It is also possible for an operator to select whether unknown words, that is, words which do not match a spelling dictionary, are spelled out or pronounced.

Figure 5A:
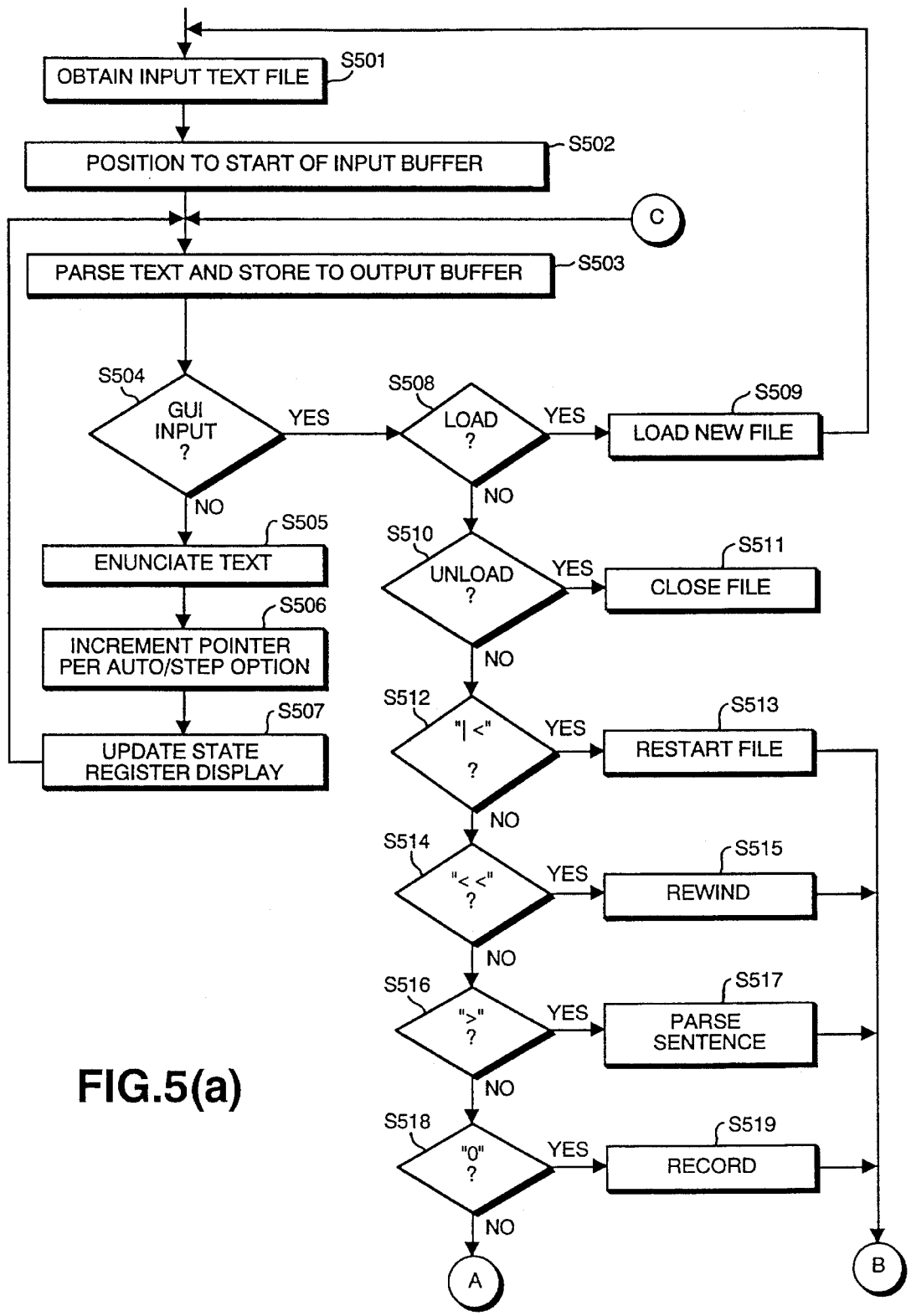
FIGS. 5(a) and 5(b), is a flow diagram for explaining text control according to the invention.
Figure 5B:
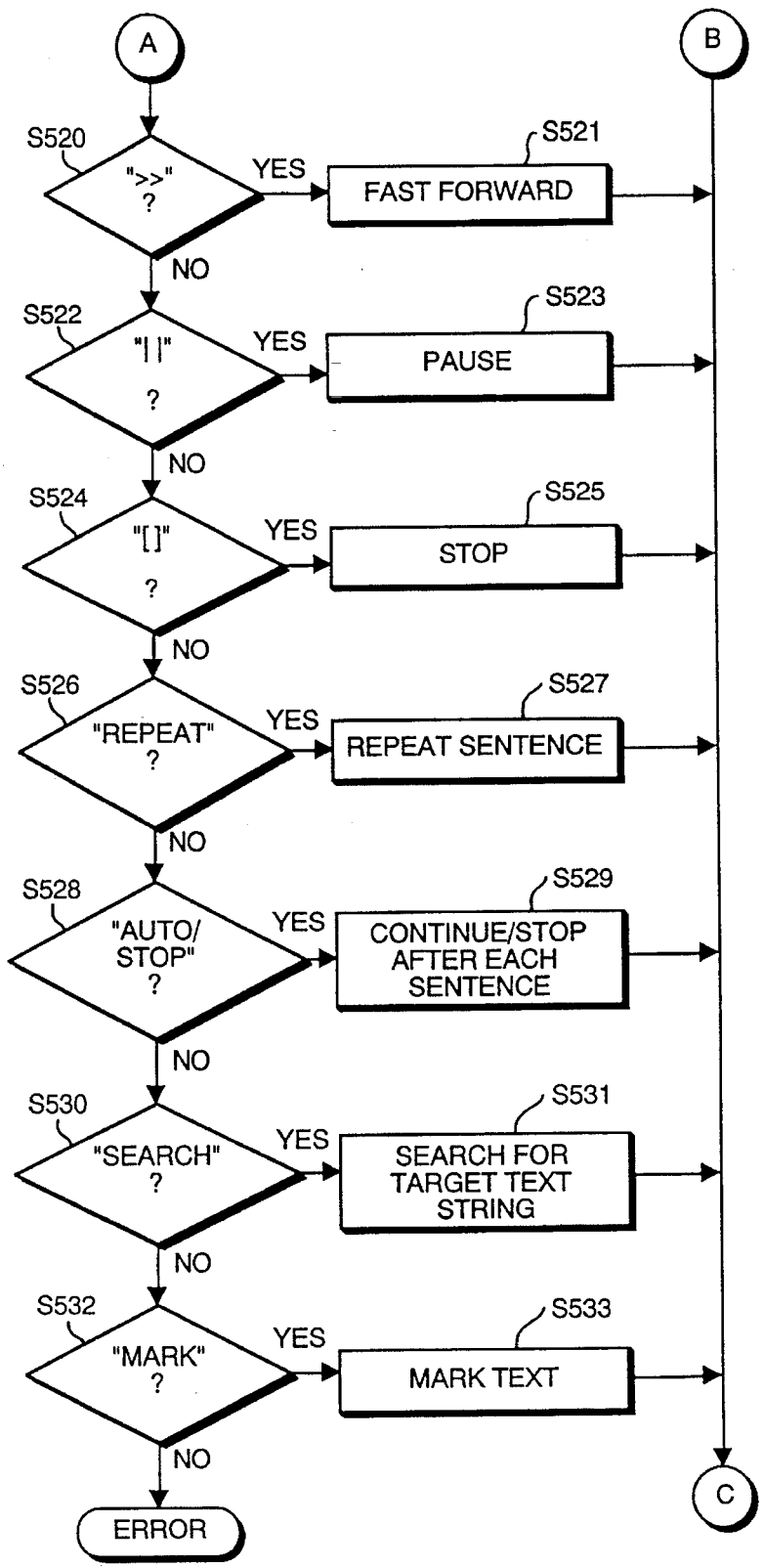

FIG. 5 is a detailed flow diagram showing operation of the present embodiment. The process steps shown in FIG. 5 are stored as program instruction sequences in mass memory 20 and executed by CPU 11.

In step S501, an input text file is obtained and loaded into input buffer 31. As mentioned above, the input text file can be obtained from any of a variety of sources, such as a word processing text file, a DOS text file, electronic mail, etc.

In step S502, pointer 34 is positioned to the start of input buffer 31, and the text and/or embedded commands at the position of pointer 34 in input buffer 31 is parsed by text parser 30 as described more fully in the aforementioned copending application, "Text Parser For Text-To-Speech Processor" (step S503). The parsed text, with embedded speech commands, is stored in output buffer 32 from which the text and/or embedded commands are provided to text-to-speech converter 26 for enunciation over speaker 27 and/or telephone interface 24. At the same time, the text is provided to graphics user interface 36 for display on area 41, as well as to pointer controller 35 so that pointer controller 35 can detect text boundaries.

Step S504 determines whether an operator command, here a graphical user interface command, has been issued by the operator. If a graphical user interface command has not been input, then flow advances to step S505 in which text is enunciated, and thence to step S506 where pointer controller 35 increments the position of pointer 34. The position of pointer 34 is incremented in accordance with the auto/step toggle 45 such that when the auto mode is selected, the pointer advances continuously from sentence to sentence, thereby achieving more or less continuous speech. On the other hand, if the auto/step toggle 45 is set to the step mode, then pointer controller 35 causes pointer 34 to stop after each sentence. Pointer controller 35 advances pointer 34 only after the play/parse command (">", see step S516) is received from the graphical user interface.

In step S507, state register 44 is updated based on the current state of the apparatus. Thus, for example, CPU 11 causes the state register to display "LOADED", "PLAYING", "RECORDING", "REWINDING", "FAST FORWARDING", "PAUSED", "STOPPED", "UNLOADED", all in accordance with the current state of the apparatus.

Flow then returns to step S503 whereby the pointer 34 is automatically advanced through the text in input buffer 31, and that text is parsed by parser 30 and then enunciated by text-to-speech converter 26, until a graphical user interface command is received.

If in step S504 an operator command is received, then flow branches to determine the type of command.

If the operator has input the "LOAD" graphical user interface command (step S508), then flow advances to step S509 in which CPU 11 asks for a new file name, provides aid to the operator in selecting the new file name, loads the new file into input buffer 31, and parses the file to output buffer 32. Flow then returns to step S501.

If the operator has input the "UNLOAD" graphical user interface command (step S510), then flow then advances to step S511 in which the current file is closed.

If the operator has selected the "|<" graphical user interface command (step S512), then flow advances to step S513 in which the pointer is repositioned to the beginning of output buffer 32 so as to restart speaking of the text in the output buffer. Flow then returns to step S503 whereby the text in input buffer 31 is parsed and then is enunciated from the repositioned pointer.

If the operator selects the "<<" graphical user interface command (step S514), then flow advances to step S515 in which pointer 34 is repositioned backwards through the text in input buffer 31. If desired, the repositioning can be achieved with backwards queuing, whereby samples of the text on text boundaries, for example, three words out of twenty, is extracted and fed to text-to-speech converter 26 for enunciation. By virtue of this feature, it is possible for the operator to monitor the backward progression of pointer 34 through the text in input buffer 31. When CPU 11 determines that the "<<" command is no longer selected, then flow returns to step S503, whereupon the text is parsed and then enunciated starting from the altered positioned of the pointer.

If the operator has input the ">" graphical user interface command (step S516), then flow advances to step S517 in which pointer 34 is advanced through the text in input buffer 31. The pointer is advanced on text boundaries and, for example, if the auto/step toggle 45 is set to the step mode, selection of this command will restart movement of pointer 34 through the input buffer. If the auto/step toggle 45 is set to the auto mode, then selection of this command operates much the same as a play button whereby text is provided to the text-to-speech converter 26 more or less continuously. Flow then returns to step S503.

If the operator selects the "0" graphical user interface command (step S518), then flow advances to step S519 in which voice is recorded. Voice recording can take two forms. In the first form, text (for example, from a text clipboard) is simply copied into the current text file. In the second form, waveform files which correspond to digitized sound such as speech or music can be recorded into a waveform file. In particular, it is possible to record the waveform file generated by the text-to-speech converter 26. Such waveform files can be useful in a system which is not provided with a text-to-speech converter. Flow then returns to step S503.

If the operator selects the ">>" graphical user interface command (step S520), then flow advances to step S521 which fast forwards through the text in input buffer 31. More particularly, pointer controller 35 controls pointer 34 so as to move rapidly through the text file. If desired, pointer controller 35 can cause pointer 34 to sample the text in input buffer 31 on text boundaries, for example, three words out of twenty, extract those text samples and speak them through text-to-speech converter 26. When CPU 11 determines that the ">>" command is no longer selected, then flow returns to step S503 to continue text-to-speech processing from the altered pointer position.

If the operator selects the "||" graphical user interface command (step S522) then flow advances to step S523 in which pointer controller 35 causes pointer 35 to pause at the next text boundary, for example, at the end of the current sentence. Upon second actuation of the "||" button, CPU 11 causes pointer controller 35 to resume automatic advance of pointer 34, and flow returns to step S503.

If the operator selects the "[]" graphical user interface command (step S524), then flow advances to step S525 in which pointer controller 35 causes pointer 34 to stop at the end of the next text boundary, for example, at the end of the current sentence or word. If desired, the pointer can be repositioned to the beginning of the text file or it may be maintained in its current position so as to resume text-to-speech processing upon actuation of the ">" graphical user interface command. Flow then returns to step S503.

If the operator selects the "REPEAT" graphical user interface command (step S526), then flow advances to step S527 in which pointer controller 35 causes the pointer 34 to reposition to the beginning of the previous sentence so as to cause that sentence to be repeated. Flow then returns to step S503 so as to resume text-to-speech processing from the altered pointer position.

If the operator selects the auto/step toggle graphical user interface command (step S528), then flow advances to step S529 in which the auto/step toggle 45 is altered based on the operator's selection. Flow then returns to step S503.

If the operator selects the "SEARCH" graphical user interface command (step S530), then flow advances to step S531 in which CPU 11 requests a target text string and then searches forward or backward through the text for the first occurrence of that text string. Pointer controller 35 then alters pointer 34 to that position and flow returns to step S503 so as to resume text-to-speech processing from the altered pointer position.

If the operator selects the "MARK" graphical user interface command (step S532), then flow advances to step S533 in which the text at the current pointer position is marked whereby it is possible to return to the marked text position at a future time. Flow then returns to step S503 to continue text-to-speech processing from the current pointer position.

The foregoing flow diagram has been explained in connection with operator commands received via a graphical user interface. Operator commands can also be received via other operator input, for example, directly from keyboard 19, or from a remotely located operator via DTMF decoder 24a and voice telephone interface 24. More specifically, it is possible for a remote operator to access the text controller of the present invention via an ordinary voice telephone line and to request text-to-speech converter 26 to enunciate operator specifiable files over voice telephone interface 24. In this situation, operator commands are received from the voice telephone line, for example, through voice recognition or, more conveniently, through operator actuation of the buttons on a touch telephone keypad. The tones generated by the touch telephone keypad are decoded by DTMF decoder 24a and are provided to CPU 11 which interprets those commands in accordance with the flow diagram of FIG. 5.

What is claimed is:

1. A text-to-speech controller for controllably feeding a text file from a text buffer to a text-to-speech converter, the text file being comprised by text characters organized into words, including:
   an interface for inputting user commands which indicate how the text characters in the text file are fed from the text buffer to the text-to-speech converter; and
   a controller for effectuating the user commands at interword text boundaries such that the text characters are fed at interword text boundaries from the text buffer to the text-to-speech converter in accordance with the user commands.

2. A controller according to claim 1, wherein said interface is comprised by a graphical user interface for inputting the user commands to alter how text is fed from the text buffer to the text-to-speech converter.

3. A controller according to claim 2, wherein the graphical user interface includes means for monitoring the text-to-speech conversion.

4. A controller according to claim 3, wherein said means for monitoring includes a state register display for displaying current status of the controller and a text display for displaying text currently being subjected to text-to-speech processing.

5. A controller according to claim 2, wherein said graphical user interface includes a VCR-style control panel having a load button, a rewind button, a play button, a fast-forward button, a stop button and an unload button.

6. A controller according to claim 1, further comprising a voice telephone interface including a DTMF decoder, wherein the user commands are received via the DTMF decoder.

7. A controller according to claim 6, wherein the text-to-speech converter speaks text over the voice telephone interface.

8. A controller according to claim 1, further comprising access means for accessing remotely-located text files, wherein text from the remotely-located text files is stored in the text buffer.

9. A controller according to claim 8, further comprising parsing means for parsing text from the remotely-located files for storage in the text buffer.

10. A controller according to claim 1, wherein said interface further includes means for accepting parameter commands to alter text-to-speech conversion parameters.

11. A controller according to claim 10, wherein said means for accepting parameter commands is provided by a graphical user interface.

12. A text-to-speech controller, comprising:
    a text buffer for storing a text file comprised by text characters organized into words;
    a controller for controllably feeding text characters in the text file from said text buffer to a text-to-speech converter; and
    command means including a graphical user interface for accepting input commands to alter how said controller feeds text characters from said text buffer to the text-to-speech converter;
    wherein said controller sequentially feeds text characters from said text buffer to said text-to-speech converter in the absence of commands from said command means, and wherein said controller alters how text characters are fed from said text buffer to the text-to-speech converter in response to commands from said command means which are effectuated at interword text boundaries.

13. A controller according to claim 12, wherein said controller effectuates text control at sentence boundaries.

14. A controller according to claim 12, wherein said graphical user interface includes commands to advance through the text in said text buffer, and wherein said controller effectuates said commands to advance at interword text boundaries.

15. A controller according to claim 14, wherein said advance command is a fast advance command in which text samples are extracted at interword text boundaries and in which the extracted text samples are fed to the text-to-speech converter for enunciation at normal speed.

16. A controller according to claim 12, wherein said graphical user interface includes commands to repeat text segments, and wherein, said controller repeats text segments beginning at interword text boundaries.

17. A controller according to claim 12, wherein said graphical user interface includes commands to stop feeding text to the text-to-speech converter, and wherein said controller stops on interword text boundaries.

18. A controller according to claim 12, wherein said graphical user interface includes commands to search for designatable text strings and wherein said controller searches for an occurrence of the designatable text string in the text in said text buffer and begins feeding text from said text buffer to the text-to-speech converter commencing with an occurrence of the designatable text string.

19. A controller according to claim 12, wherein said graphical user interface includes means for displaying a state register which displays current status of said controller.

20. A controller according to claim 12, wherein said graphical user interface includes a text display for displaying text that is being fed to the text-to-speech converter and for emphasizing the display of text currently being enunciated.

21. A controller according to claim 12, wherein said graphical user interface includes a talking head for mimicking enunciation of text that is fed to the text-to-speech converter.

22. A controller according to claim 12, wherein said graphical user interface includes means to vary text-to-speech conversion parameters.

23. A controller according to claim 12, wherein said controller automatically advances through text in said text buffer in accordance with one of at least two selectable modes, wherein in the first mode said controller advances through text continuously, and wherein in said second mode said controller steps through text in the text buffer based on manual commands from the graphical user interface.

24. A controller according to claim 23, wherein in said second mode, selectable levels of granularity may be designated through the graphical user interface.

25. A controller according to claim 24, wherein the selectable level of granularity include sentences, words and paragraphs.

26. A controller according to claim 12, wherein said controller includes a pointer for pointing to text in said text buffer, and wherein said controller controls the position of said pointer in accordance with input commands from said command means.

27. A controller according to claim 26, wherein said controller advances said pointer automatically and alters the position of said pointer in accordance with input commands input from said command means.

28. A controller according to claim 12, further comprising a voice telephone interface for receiving speech generated by the text-to-speech converter and for putting the generated speech on a voice telephone line.

29. A controller according to claim 28, wherein said voice telephone interface includes a DTMF decoder for decoding DTMF commands, wherein said controller is responsive to DTMF commands to alter how text is provided to the text-to-speech converter.

30. A controller according to claim 12, further comprising access means for accessing remotely-located files.

31. A controller according to claim 12, further comprising a parser for parsing text in said text buffer.

32. A text-to-speech controller according to claim 12, wherein said graphical user interface includes a VCR-style control panel having a load button, a rewind button, a play button, a fast-forward button, a stop button and an unload button.

33. A text-to-speech processor comprising:
an input buffer for storing files that include text characters organized into words;
an output buffer for storing text characters and embedded speech style commands;
a text parser for parsing the text characters in said input files, for generating speech style commands, and for storing parsed text characters and embedded speech style commands in said output buffer;
a text-to-speech converter for converting text characters in said output buffer into speech styled in accordance with the speech style commands embedded in said text characters;
command means including a graphical user interface for accepting input commands; and
a controller including a pointer to text characters in said input buffer for controllably feeding text characters from said input buffer at the position of said pointer to said text parser, said controller automatically advancing the position of said pointer in the absence of input commands and said controller altering the position of said pointer in response to input commands which are effectuated at interword text boundaries.

34. A processor according to claim 33, wherein said controller effectuates text control at sentence boundaries.

35. A processor according to claim 33, wherein said controller includes a graphical user interface.

36. A processor according to claim 35, wherein said graphical user interface includes commands to advance through the text in said text buffer, and wherein said controller alters the position of said pointer so as to effectuate said advance commands at interword text boundaries.

37. A processor according to claim 36, wherein said advance command is a fast advance command in which text samples are extracted on interword text boundaries and the extracted text samples are fed to the text-to-speech converter for enunciation at normal speed.

38. A processor according to claim 35, wherein said graphical user interface includes commands to repeat text segments, and wherein said controller alters the position of said pointer so as to repeat text segments beginning at interword text boundaries.

39. A processor according to claim 35, wherein said graphical user interface includes commands to stop feeding text to the text-to-speech converter, and wherein said controller stops said pointer at interword text boundaries.

40. A processor according to claim 35, wherein said graphical user interface includes commands to search for designatable text strings and wherein said controller searches for an occurrence of the designatable text string in the text in said text buffer and alters the position of said pointer so as to begin feeding text from said text buffer to the text-to-speech converter commencing with an occurrence of the designatable text string.

41. A processor according to claim 35, wherein said graphical user interface includes means for displaying a state register which displays current status of said controller.

42. A processor according to claim 35, wherein said graphical user interface includes a text display for displaying text that is being fed to the text-to-speech converter and for emphasizing the display of text currently being enunciated.

43. A processor according to claim 35, wherein said graphical user interface includes a talking head for mimicking enunciation of text that is fed to the text-to-speech converter.

44. A processor according to claim 35, wherein said graphical user interface includes means to vary text-to-speech conversion parameters.

45. A processor according to claim 33, wherein said controller automatically advances through text in said text buffer in accordance of one of at least two selectable modes, wherein in the first mode said controller advances through text continuously, and wherein in said second mode said controller steps through text in the text buffer based on manually input operator commands which are effectuated at interword text boundaries.

46. A processor according to claim 45, wherein in said second mode, selectable levels of granularity may be designated.

47. A processor according to claim 46, wherein the selectable level of granularity include sentences, words and paragraphs.

48. A text-to-speech processor according to claim 33, wherein said graphical user interface includes a VCR-style control panel having a load button, a rewind button, a play button, a fast-forward button, a stop button and an unload button.

49. A text-to-speech processing apparatus comprising:

a processing unit including a computer for executing stored program process steps;

command means by which an operator can issue commands;

a memory for storing plural files including at least some files which contain text characters organized into words, and for storing process steps for execution by said processing unit; and a text-to-speech converter for converting text characters into speech styled in accordance with speech style commands;

wherein said process steps include steps to select one of the files stored in said memory, to provide text characters from the selected file to said text-to-speech converter, and to alter how text characters are provided from the selected file to said text-to-speech converter in accordance with operator commands from said command means which are effectuated at interword text boundaries, whereby text characters in the selected file are converted to speech in an operator-controllable order.

50. A text-to-speech processing apparatus according to claim 49, further comprising access means for accessing remote text files, wherein said process steps include process steps to parse text in said remotely-located files and steps to store the parsed text.

51. A text-to-speech processing apparatus according to claim 50, wherein said access means includes a LAN interface for accessing local area network files.

52. A text-to-speech processing apparatus according to claim 50, wherein said access means includes a modem for downloading binary data files modulated on a voice telephone line.

53. A text-to-speech processing apparatus according to claim 50, wherein said access means includes a facsimile interface, and wherein said process steps include process steps to perform optical character recognition on received facsimiles and steps to store resulting text into a file in said memory.

54. A text-to-speech processing apparatus according to claim 49, wherein said controller effectuates text control at sentence boundaries.

55. A text-to-speech processing apparatus according to claim 49, further comprising a monitor for displaying a graphical user interface, the graphical user interface comprising said command means, and wherein said process steps include steps to generate the graphical user interface display.

56. A text-to-speech processing apparatus according to claim 55, wherein said graphics user interface includes commands to advance through the text in said text buffer, and wherein said processing unit effectuates said advance commands at interword text boundaries.

57. A text-to-speech processing apparatus according to claim 56, wherein said advance command is a fast advance command in which text samples are extracted on interword text boundaries and the extracted text samples are fed to the text-to-speech converter for enunciation at normal speed.

58. A text-to-speech processing apparatus according to claim 55, wherein said graphical user interface includes commands to repeat text segments, and wherein said processing unit repeats text segments beginning at interword text boundaries.

59. A text-to-speech processing apparatus according to claim 55, wherein said graphical user interface includes commands to stop feeding text to the text-to-speech converter, and wherein said processing unit stops on interword text boundaries.

60. A text-to-speech processing apparatus according to claim 55, wherein said graphical user interface includes commands to search for designatable text strings and wherein said processing unit searches for an occurrence of the designatable text string in the text in said text buffer and begins feeding text to the text-to-speech converter commencing with an occurrence of the designatable text string.

61. A text-to-speech processing apparatus according to claim 55, wherein said graphical user interface includes means for displaying a state register which displays current status of said processing unit.

62. A text-to-speech processing apparatus according to claim 55, wherein said graphical user interface includes a text display for displaying text that is being fed to the text-to-speech converter and for emphasizing the display of text currently being enunciated.

63. A text-to-speech processing apparatus according to claim 55, wherein said graphical user interface includes a talking head for mimicking enunciation of text that is fed to the text-to-speech converter.

64. A text-to-speech processing apparatus according to claim 55, wherein said graphical user interface includes means to vary text-to-speech conversion parameters.

65. A text-to-speech processing apparatus according to claim 55, wherein said graphical user interface includes a VCR-style control panel having a load button, a rewind button, a play button, a fast-forward button, a stop button and an unload button.

66. A text-to-speech processing apparatus according to claim 49, wherein said process steps include steps whereby text is provided to said text-to-speech converter in accordance of one of at least two selectable modes, wherein in the first mode text is advanced continuously, and wherein in said second mode text is advanced based on manual operator commands from said command means which are effectuated at interword text boundaries.

67. A text-to-speech processing apparatus according to claim 66, wherein in said second mode, selectable levels of granularity may be designated.

68. A text-to-speech processing apparatus according to claim 66, wherein the selectable level of granularity include sentences, words and paragraphs.

69. A text-to-speech processing apparatus according to claim 49, wherein said processing unit maintains a pointer for pointing to text provided to said text-to-speech converter, and wherein said processing unit controls the position of said pointer in accordance with operator commands from said command means.

70. A text-to-speech processing apparatus according to claim 69, wherein said processing unit advances said pointer automatically and alters the position of said pointer in accordance with operator commands input from said command means.

* * * * *

UNITED STATES PATENT AND TRADEMARK OFFICE
CERTIFICATE OF CORRECTION

PATENT NO. : 5,500,919

DATED : March 19, 1996

INVENTOR(S) : Willis J. Luther

It is certified that error appears in the above-identified patent and that said Letters Patent is hereby corrected as shown below:

COLUMN 2:

Line 32, "converter" should read --converter.--

COLUMN 4:

Line 57, "FIG. 4a" should read --FIG. 4--.

COLUMN 6:

Line 12, "is" should read --are--; and
Line 57, "pointer 35" should read --pointer 34--.

COLUMN 8:

Line 62, "wherein," should read --wherein--.

COLUMN 9:

Line 31, "level" should read --levels--.

UNITED STATES PATENT AND TRADEMARK OFFICE
CERTIFICATE OF CORRECTION

PATENT NO. : 5,500,919

DATED : March 19, 1996

INVENTOR(S) : Willis J. Luther

It is certified that error appears in the above-identified patent and that said Letters Patent is hereby corrected as shown below:

COLUMN 10:

Line 64, "accordance of" should read --accordance with--.

COLUMN 11:

Line 6, "level" should read --levels--.

COLUMN 12:

Line 45, "accordance of" should read --accordance with--; and
Line 53, "level" should read --levels--.

Signed and Sealed this

Twenty-seventh Day of August, 1996

Attest:

BRUCE LEHMAN

Attesting Officer     Commissioner of Patents and Trademarks